United States Patent
Yamada et al.

(10) Patent No.: US 8,204,975 B2
(45) Date of Patent: Jun. 19, 2012

(54) SERVER APPARATUS, CLIENT APPARATUS AND SYSTEM FOR SECURELY TRANSMITTING STORED CONTENT

(75) Inventors: Masazumi Yamada, Osaka (JP); Monta Nakatsuka, Osaka (JP); Toshiki Yamamura, Osaka (JP)

(73) Assignee: Panasonic Corporation, Osaka (JP)

( * ) Notice: Subject to any disclaimer, the term of this patent is extended or adjusted under 35 U.S.C. 154(b) by 669 days.

(21) Appl. No.: 11/547,129

(22) PCT Filed: Apr. 18, 2005

(86) PCT No.: PCT/JP2005/007740
§ 371 (c)(1),
(2), (4) Date: Oct. 4, 2006

(87) PCT Pub. No.: WO2005/104493
PCT Pub. Date: Nov. 3, 2005

(65) Prior Publication Data
US 2008/0275940 A1    Nov. 6, 2008

(30) Foreign Application Priority Data
Apr. 23, 2004 (JP) .................. 2004-127845

(51) Int. Cl.
*G06F 15/177* (2006.01)
*G06F 15/173* (2006.01)
(52) U.S. Cl. ...................... 709/223; 709/220
(58) Field of Classification Search .......... 709/229, 709/220, 223, 227, 217; 702/122; 707/10; 717/171; 710/11; 713/165
See application file for complete search history.

(56) References Cited

U.S. PATENT DOCUMENTS

| | | | |
|---|---|---|---|
| 5,790,977 A * | 8/1998 | Ezekiel ................... 702/122 |
| 6,339,423 B1 | 1/2002 | Sampson et al. |
| 6,480,887 B1 * | 11/2002 | Hayama .................. 709/217 |
| 6,687,743 B1 | 2/2004 | Innes |
| 6,870,571 B1 | 3/2005 | Narushima et al. |
| 7,188,224 B2 | 3/2007 | Ohta et al. |
| 7,299,304 B2 * | 11/2007 | Saint-Hilaire et al. ........ 710/11 |
| 7,702,795 B2 * | 4/2010 | Zintel et al. .................. 709/227 |
| 2002/0073411 A1 * | 6/2002 | Tsunedomi et al. ......... 717/171 |
| 2002/0083143 A1 | 6/2002 | Cheng |

(Continued)

FOREIGN PATENT DOCUMENTS
CN  1428034  7/2003
(Continued)

OTHER PUBLICATIONS

"Universal Plug and Play Device Architecture Version 1.0", [online], Jul. 8, 2000, UPnP Forum, [search date: Mar. 25, 2000], Internet URL:http://www.upnp.org/download/UPnPDA10_20000613.htm.

(Continued)

*Primary Examiner* — Aaron Strange
(74) *Attorney, Agent, or Firm* — Wenderoth Lind & Ponack, L.L.P.

(57) ABSTRACT

The network system comprises an original device description indicating a control point so as to register an address used for MAC address authentication. The server side acquires information from the device(s) connected to the network, and only the device(s) having the above mentioned description are listed and displayed. By responding to the access from the non-registered device in a predetermined manner, the device is prompted to be registered.

4 Claims, 8 Drawing Sheets

U.S. PATENT DOCUMENTS

| | | | |
|---|---|---|---|
| 2002/0161833 A1 | 10/2002 | Niven et al. | |
| 2003/0212772 A1* | 11/2003 | Harris | 709/220 |
| 2003/0217136 A1* | 11/2003 | Cho et al. | 709/223 |
| 2004/0073609 A1 | 4/2004 | Maekawa et al. | |
| 2004/0078338 A1 | 4/2004 | Ohta et al. | |
| 2004/0193609 A1* | 9/2004 | Phan et al. | 707/10 |
| 2004/0236945 A1* | 11/2004 | Risan et al. | 713/165 |
| 2005/0091359 A1* | 4/2005 | Soin et al. | 709/223 |
| 2005/0131910 A1* | 6/2005 | Yanagisawa | 707/10 |
| 2006/0123124 A1* | 6/2006 | Weisman et al. | 709/227 |

FOREIGN PATENT DOCUMENTS

| | | |
|---|---|---|
| EP | 0 854 621 | 7/1998 |
| EP | 1 271 841 | 1/2003 |
| JP | 2001-136467 | 5/2001 |
| JP | 2003-076627 | 3/2003 |
| JP | 2004-038526 | 2/2004 |
| JP | 2004-078570 | 3/2004 |
| JP | 2004-110817 | 4/2004 |
| JP | 2004-112489 | 4/2004 |
| WO | 01/41470 | 6/2001 |
| WO | 02/49276 | 6/2002 |
| WO | 03/030452 | 4/2003 |

OTHER PUBLICATIONS

"Media Server: 1 Device Template Version 1.0", [online], Jun. 25, 2002, PnP forum, [search date: Mar. 25, 2000], Internet <URL:http://www.upnp.org/standardizeddcps/documets/MediaServer1.0.pdf>.

Yutaka Matsushita et al., "NetCom Library, Home Network", Shokabo Publishing Co., Ltd., p. 58-p. 63, Nov. 20, 2010 with partial English translation.

Carl M. Ellison, "Home Network Security", Intel Technology Journal, vol. 6, Issue 4, p. 37-p. 48, Nov. 15, 2002.

* cited by examiner

| Client device register | | |
|---|---|---|
| No | Device name | Model number |
| 01 | DVD in living room | DMR-ExxxH |
| 02 | DVD in bed room | Manual additional device |
| 03 | DVD in children's room | DMR-ExxxH |
| Manual addition | | |
| | | |

Previous page​ ​ ​ ​ 01/01​ ​ ​ ​ Next page

FIG. 3

| | No | Device name | Model number |
|---|---|---|---|
| Client device register | | | |
| | 01 | DVD in living room | DMR-ExxxH |
| Register | 02 | DVD in bed room | Manual additional device |
| | 03 | DVD in children's room | DMR-ExxxH |
| | | Manual addition | |
| | | | |

| Previous page | 01/01 | Next page |
|---|---|---|

FIG. 4A

```
M-SEARCH * HTTP/1.1
HOST: 239.255.255.250:1900
MAN: "ssdp:discover"
MX: 20
ST: urn:xxxx-com:device:deviceType:1
```

FIG. 4B

```
HTTP/1.1 200 OK
CACHE-CONTROL: max-age = 1800
EXT:
LOCATION: (URL for UPnP description for root device)
SERVER: (OS/version)UPnP/1.0 (product/version)
ST: urn:xxxx-com:device:CrientDevice:1
USN: (advertisement UUID)
```

FIG. 5

```
412 Prediction Failed
Connection: close
X-MEI-RESULT: UPNP AUTH NG
```

| No | Server name | Model number | Manufacturer |
|----|-------------|--------------|--------------|
| 01 | DVD in living room | DMR-ExxxH | Panasonic |
| 02 | DVD in children's room | DMR-ExxxH | Panasonic |
| 03 | DVD in bed room | DMR-ExxxH | Panasonic |
|    |             |              |              |
|    |             |              |              |

AV network server list
NETWORK

Previous page   01/01   Next page

SERVER APPARATUS, CLIENT APPARATUS AND SYSTEM FOR SECURELY TRANSMITTING STORED CONTENT

BACKGROUND OF THE INVENTION

1. Technical Field

The present invention relates to a server apparatus, a client apparatus and a network system which can easily protect access to content.

2. Background Art

In order to enable detection and control of devices connected to network, a protocol called Universal Plug and Play (UPnP) is standardized (for example, refer to a non-patent literature, "Universal Plug and Play Device Architecture Version 1.0", [online], Jul. 8, 2000, UPnP Forum, [search date: Mar. 25, 2000].

UPnP uses standard Transmission Control Protocol/Internet Protocol (TCP/IP) and Internet Protocol, and realizes functions such as acquiring information on the existence and functions of other devices, and notifying the self-owned functions. Thus, setup, setting and addition of peripheral devices can be easily executed.

The basic components of the UPnP network are a device, a service and a control point. The UPnP device is a device which holds a service that is the smallest unit for control. For example, a VTR device includes a tape transport service, a tuner service and a clock service. The control point is a controller which can detect and control other devices.

The UPnP device which is newly connected to network acquires an IP address for joining the network. The acquisition of the IP address is executed by a Dynamic Host Configuration Protocol (DHCP) server automatically assigning an address to a DHCP client held by each device.

When a new device is assigned with an IP address, and can communicate, the new device (i) multicast-transmit (UDP: User Datagram Protocol) Generic Event Notification Architecture (GENA) advertise of each device and service, and (ii) announces the existence thereof (Alive transmission). Also, the new device transmits a detection message which advertises a service. Here, the advertise needs are to be retransmitted before expiration. In addition, the device transmits a message regarding explicit exit before the device goes off-line.

The control point on network is capable of (i) multicasting a Simple Service Discover Protocol (SSDP) detection message, and (ii) searching a related device and service (M-Search). Using the above mentioned technique, for example, in the case where the control point is a video control application, (i) a device which is a server of Audio and Visual (AV) content can be searched, (ii) all of the video devices on network can be displayed, and (iii) the video device which is the server of the desired content can be selected.

Figure 6:
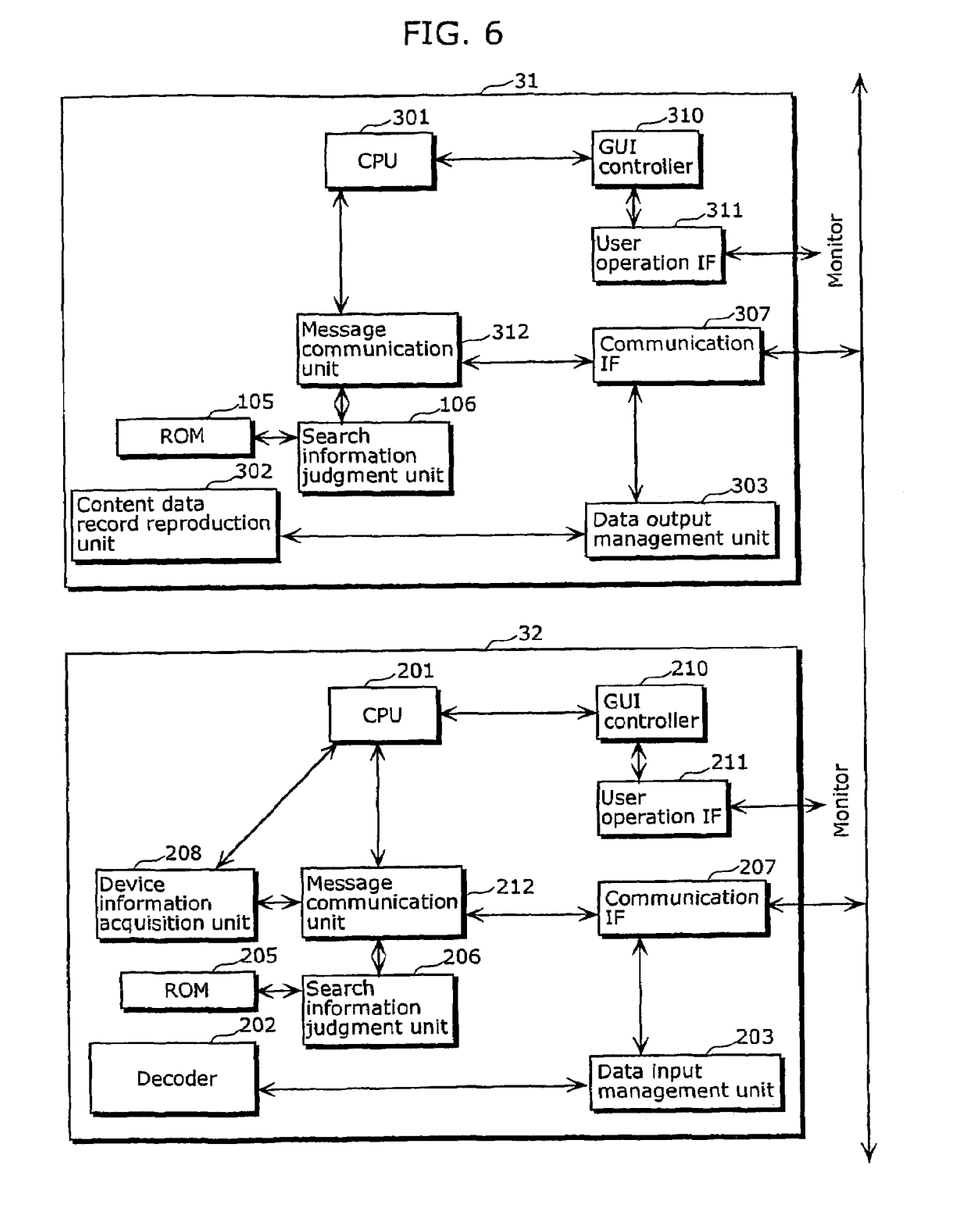
FIG. 6 is a block diagram showing a configuration of a conventional network system.

FIG. 6 is a configuration diagram showing a conventional network system. As shown in FIG. 6, the network system comprises: a server 31 which is a device including a server function; a client 32; and a network 3. The client 32 includes a control point function and a renderer function which displays a reception decode.

A CPU 301 executes a process for managing a device connected to the network 3 according to the management program. An ROM 105 holds a start-up program for starting up the server 31. After the start-up, the server 31 executes predetermined processes such as the above mentioned DHCP and Alive transmission.

In the client 32, a CPU 201 (i) causes a Graphical User Interface (GUI) controller 210 and a user operation Interface (IF) 211 to display a menu screen, "device selection", and (ii) causes a message communication unit 212 to transmit, via a communication IF 207, an M-Search message which searches a server for a device on the network 3.

The M-search message has an SSDP request format using Hypertext Transport Protocol Multicast (HTTPMU) which uses Hypertext Transport Protocol (HTTP) on the UDP. Here, as the search criteria, "Media Server" service defined by UPnP forum is included (for example, refer to the non-patent literature, "Media Server: 1 Device Template Version 1.0", [online], Jun. 25, 2002, PnP forum, [search date: Mar. 25, 2000]. The device which received the M-Search message (i) listens to the standard multicast address of the message, and (ii) responses whether or not the service held by the device corresponds with the search criteria of the detection message.

In the ROM 105 of the server 31, "Media Server" is memorized as device information. A search information judgment unit 106 of the server 31 compares the device information of the ROM 105 with the content of the M-search message received via a communication IF 307 and a message communication unit 312. As a result of the comparison, if the search information judgment unit 106 confirms that the device information corresponding with the M-Search content exists, the search information judgment unit 106 notifies the fact to the message communication unit 312. Then, the message communication unit 312 generates a message indicating the above mentioned correspondence with the search conditions, and responds to the client 32 via the communication IF 307. The response to the search request is transmitted, using the unicast UDP attached with the SSDP header, to the IP address of the client 32 which started the search.

The response to the search request includes a Uniform Resource Locator (URL) which can acquire Device Description. In the client 32, in order to acquire the Device Description of the UPnP, a device information acquisition unit 208 which received the response via the communication IF 207 and message communication unit 212 causes the message communication unit 212 to (i) generate an HTTP GET request regarding the URL included In the response message, and (ii) issue the HTTP GET request via the communication IF 207. In response to the HTTP GET request received via the communication IF 307, the message communication unit 312 of the server 31 (i) acquires, via the search information judgment unit 106, the Device Description information included in the ROM 105, and (ii) returns the Device Description information to the client 32 via the communication IF unit 307.

The Device Description Information lists, in eXtensible Makeup Language (XML) format, properties related to the device such as information regarding a service set provided by the device type, the device model name, the model number, the manufacturer name, the description information regarding the product, the serial number, the Friendly Name (device name), and the icon.

Figure 7:
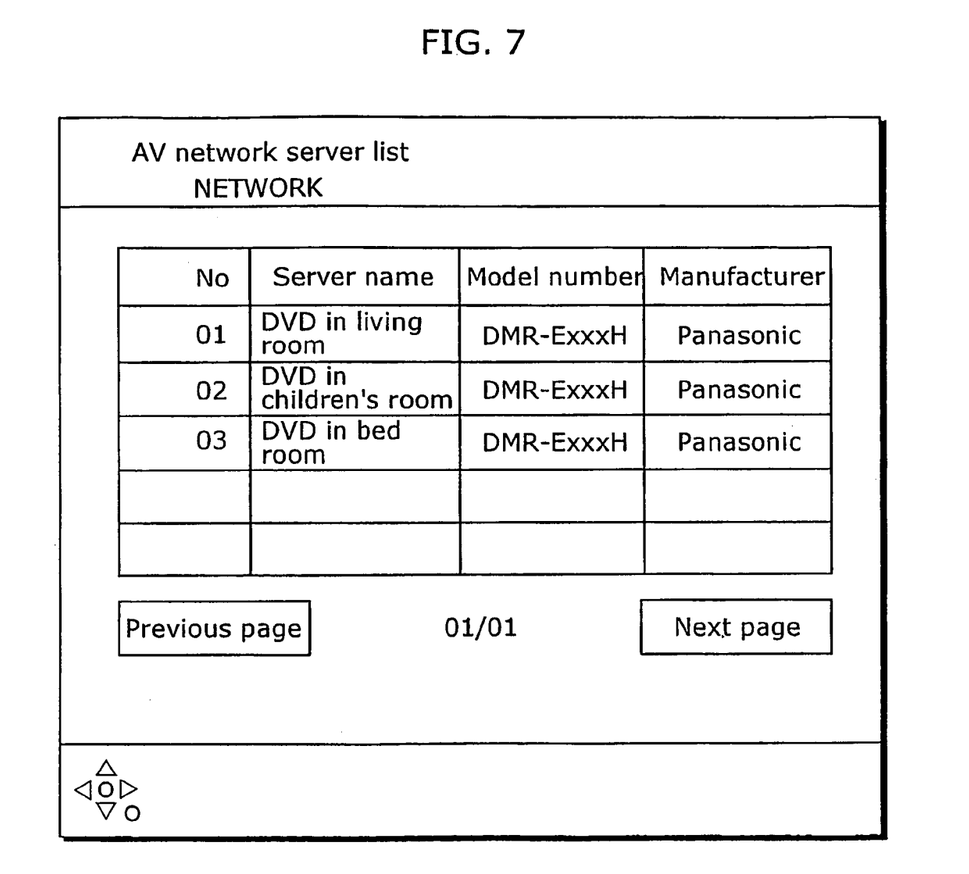
FIG. 7 is a diagram showing an example of a conventional display screen.

The device information acquisition unit 208 of the client 32 (i) receives the Device Description information via the communication IF 207 and message communication unit 212, and (ii) requests the CPU 201 to analyze the information. Then, the CPU 201 analyzes the list of the XML format, and acquires information such as the device model name and Friendly Name. The CPU 201, using the acquired information, causes the GUI controller 210 and user operation IF 211 to sequentially display, on the monitor, the list of the devices corresponding with the search conditions, that are here, the Media Server devices. An example of the display screen is shown in FIG. 7.

The pointer (URL) to the Service Description is included in the Device Description information. And, the Service Description can be acquired as well as the Device Description by HTTP GET request to the URL. FIG. 7 is an XML document including a list of all services such as veranda-specific information, definition of embedded device, URL of device presentation, and URL of control and eventing. Thus, by accessing the control URL of the Device Description of the device (here, the server 31) selected from the control point of the client 32, the device can be controlled. The access is executed using the Simple Object Access Protocol (SOAP).

The control point of the client 32, using the control, after acquiring information of Content Directory Service (CDS) for notifying the content list held by the device, by accessing the URL described therein, acquires data stream of AV content. When the CPU 201 of the client 32 instructs the message communication unit 212 to access the URL of the server 31, the message communication unit 212, according to the instruction, (i) generates a message requesting to acquire data using HTTP GET, and (ii) causes the communication IF 201 to transmit the generated message to the predetermined port of the communication IF 307. The server 31, according to the request, while adjusting transmission timing, rate and the like using the data output management unit 303, outputs the data included in the content data record reproduction unit 302, via the communication IF 307. The client 32, while adjusting the request using a data input management unit 203 so that the decoder 202 can process the request, (i) receives the data stream from the communication IF 207, and (ii) executes reproduction using the decoder 202.

Also, if the client 32 registers URL (registering of eventing) in eventSubURL of the Device Description included in the server 31, when the state of the server 31 is changed, the change can be notified to the above mentioned URL (URL of CALLBACK header) registered by the client 32. For example, when the content list information changes, on the server 31 side, due to content removal, name change, new addition caused by recording, the change can be notified to the client 32.

Here, the server device which is connected to network and holds AV content needs to deal with the threat from the network. Specifically, the following threats are assumed: intrusion from Internet into a recorder; intrusion from a fragile radio Local Area Network (LAN) into a recorder; family's intrusion from an in-home network into an individual specific recorder; blocking of user's communication by an unauthorized request transmitted from Internet; and the like.

As countermeasures against the above mentioned threats, access limit such as (i) authenticating, when accessing, the information which is not desired to be open to the third party, and (ii) rejecting access from Internet is necessary for a consumer AV device connected to network in the future.

However, unlike a Personal Computer (PC) and the like, a consumer AV device has a poor input system. And, it causes a large burden to force the user to input the password for every access on the side of the client device. Also, a method for registering, in advance, the client devices (control points) for which access is permitted on the side of the server device is conceivable. However, in such case as described above, there are a large number of characters to be inputted, and this is a large burden for the user.

As an improvement measure for the above mentioned problem, a method for (i) displaying the list of the client devices which may access from the server, and (ii) selecting and registering the client devices for which access is permitted is conceivable. However, according to the UPnP, as described above, the responses to the advertise and search are defined for the device on the side to be controlled. On the other hand, the client device side needs not to be discovered by the server device in the regular use, and does not have the defined responses to the advertise and search as described above. Therefore, there is a problem that the client devices (control points existing on network) which may access cannot be confirmed on the side of the server device.

SUMMARY OF THE INVENTION

The object of the present invention, in view of the above mentioned problems, is to provide a server apparatus, a client apparatus and a network system which can easily realize access limit on a server apparatus in a commercial audio video device.

In order to achieve the above mentioned object, the server apparatus according to the present invention comprises: a reception unit operable to receive a second inquiry using a predetermined protocol from the client apparatus connected via the network; a specification-information extraction unit operable to extract Information for specifying the client apparatus which is a transmission source out of the second inquiry received by said reception unit; a memory unit operable to store information regarding a client whose response to the second Inquiry is permitted; a judgment unit operable to judge whether or not the information registered in said memory unit corresponds with the information acquired by said specification-information extraction unit; and a response unit operable to respond in a predetermined manner to the second inquiry based on the judgment of said judgment unit.

Also, the client apparatus according to the present invention is connected to a server apparatus via a network, and acquires content information held by the server apparatus. And, the client apparatus comprises: a reception unit operable to receive a first inquiry using a predetermined protocol from a device connected to the network; a comparison unit operable to compare details of the received first inquiry with predetermined details stored in the client apparatus; and a transmission unit operable to transmit a predetermined message to the network when the comparison result of the comparison unit indicates that the details of the received first inquiry match the predetermined details.

In addition, the network system according to the present invention is configured by, at least, the server apparatus, a client apparatus and a network connecting the server apparatus and the client apparatus, the network system comprising: a client reception unit provided in the client apparatus and operable to receive a response from the server apparatus; a client judgment unit operable to judge whether or not the response received by said client reception unit indicates that the client apparatus is not registered; and a display unit operable to display on an operation screen of said client apparatus a registration status of said client apparatus, according to the result of said judgment unit.

The present invention cannot only be realized as the server apparatus, the client apparatus and the network system, but also as a method for limiting access to the server apparatus, a program which causes a computer to execute the program, and a computer-readable recording medium such as a CD-ROM in which the program is recorded.

According to the server apparatus, the controller and the network system of the present invention, the network AV client devices can be registered, using simple procedures. The access limit can be realized, and the registered client can acquire and reproduce data without password input. Also, in the case where access is rejected by the access limit, the client device can display the access rejection to the user by distinguishing from other reasons, and prompt the client device registering.

Further Information About Technical Background To This Application

The disclosure of Japanese Patent Application No. 2004-127845 filed on Apr. 23, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE INVENTION

The object of the present invention, in view of the above mentioned problems, is to realize registering a network AV client device using simple procedures by minimizing the additional configuration to a UPnP mounting device.

Hereinafter, the embodiments according to the present invention will be explained referring to the drawings.
(First Embodiment)

Figure 1:
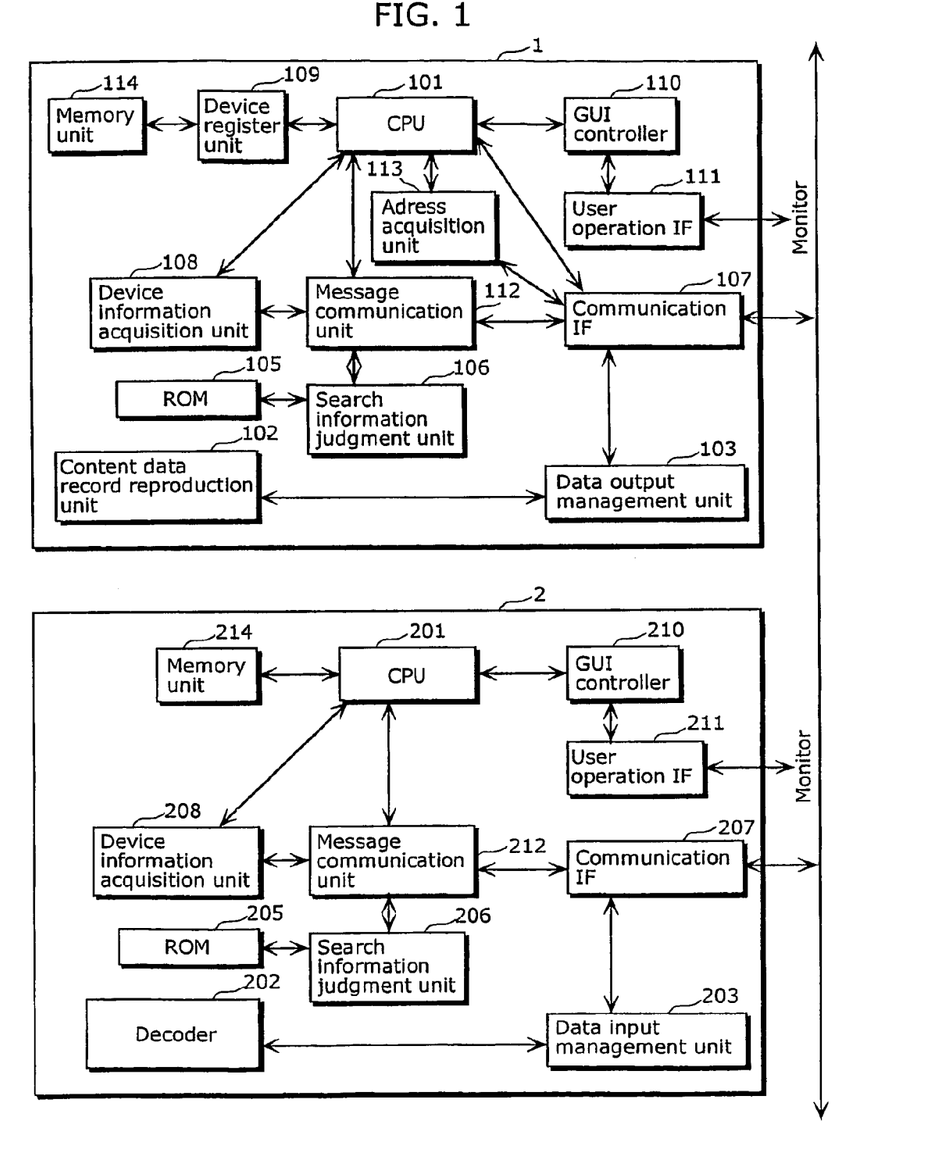
FIG. 1 is an illustration showing the network system according to the present invention.

FIG. 1 is a block diagram showing a configuration example of the network system according to the first embodiment of the present Invention. In FIG. 1, the same components as FIG. 6 are provided with the same codes. According to the network system of the present invention, the processes of a server 1 and a client 2 are different from the conventional network system as shown in FIG. 6.

In the server 1 as shown in FIG. 1, a CPU 101 causes a monitor to display information acquired from an address acquisition unit 113 and a communication IF 107, using a GUI controller 110 and a user operation IF 111. And, the CPU 101 causes a device register unit 109 to (i) register and remove, into a memory unit 114, device information of a device specified by a user, via a user operation IF 111, and (ii) acquire the device information memorized in the memory unit 114. A content data record reproduction unit 102 records and reproduces AV content. A data output management unit 103 manages the AV content recorded in the content data record reproduction unit 102. A search information judgment unit 106 searches information memorized in an ROM 105, and acquires necessary information from the ROM 105. A communication IF 107 manages input and output of data to a network 3. A device information acquisition unit 108 acquires necessary device information from the memory unit 114, via the CPU 101 and the device register unit 109. The GUI controller 110 displays via the user operation IF 111, on a monitor, a Graphical User Interface (GUI) which can judge a device desired to be registered. The user operation IF 111 displays information to the user and receives an instruction from the user. A message communication unit 112 generates a message and communicates the message via the communication IF 107. An address acquisition unit 113 acquires, from the message received by the communication IF 107, a Media Access Control (MAC) address and an IP address of the client 2.

Also, in the client 2, a CPU 201 causes a monitor to display the information acquired by a memory unit 214, a device information acquisition unit 208 and a message communication unit 212, using a GUI controller 210 and a user operation IF 111. And, the CPU 201 manages input and output of the device information memorized in the memory unit 214. An ROM 205 memorizes device information. A communication IF 207 manages input and output of data to a network 3. A message communication unit 212 generates a message, and communicates the message via the communication IF 207. A search information judgment unit 206 (i) compares the message content received by the message communication unit 212 with the information memorized in the ROM 205, and (ii) acquires necessary information from the ROM 205. A device information acquisition unit 208 acquires device information memorized in the memory unit 214 via the CPU 201. A GUI controller 210 generates information to present the user as GUI, and displays via a user operation IF 211. The user operation IF 211 inputs a user's instruction. And, a data input management unit 203 causes a decoder 202 to decode data received from the communication IF 207.

Figure 8A:
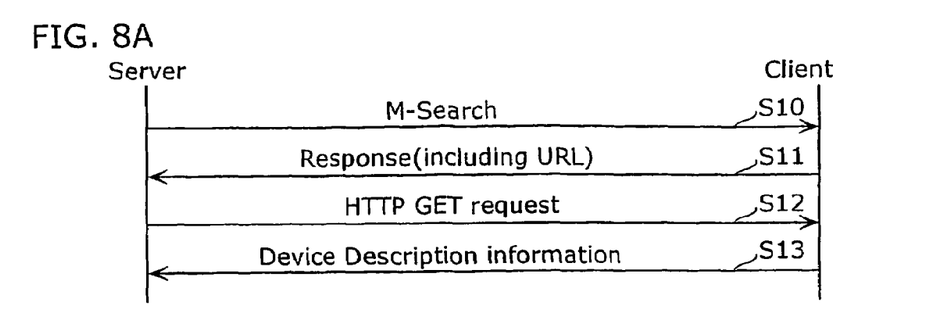
FIG. 8A is a communication sequence diagram between a server and client according to the first embodiment.

FIG. 8A is a communication sequence diagram between the server 1 and the client 2. First, a menu screen of "client registering" is displayed by the GUI controller 110 and the user operation IF 111 of the server 1. Then, the message communication unit 112 of the server 1 transmits an M-Search request to the device on the network 3 via the communication IF 107 (S10).

Figure 4A:
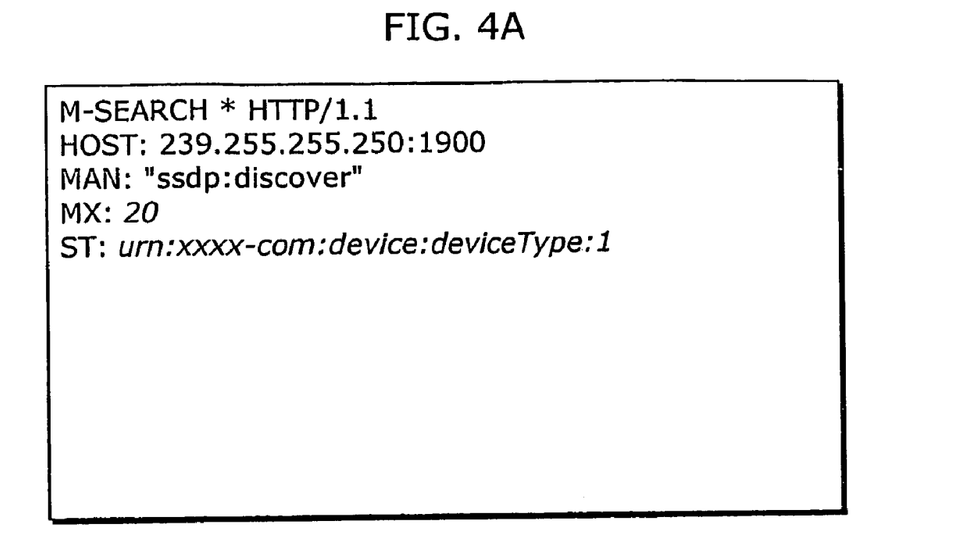
FIG. 4A is a diagram showing an example of the message for searching "Client Device"

Although an M-Search request from a general AV client device searches "Media Server", the message communication unit 112 generates a message which searches "Client Device" as shown in FIG. 4A.

Figure 4B:
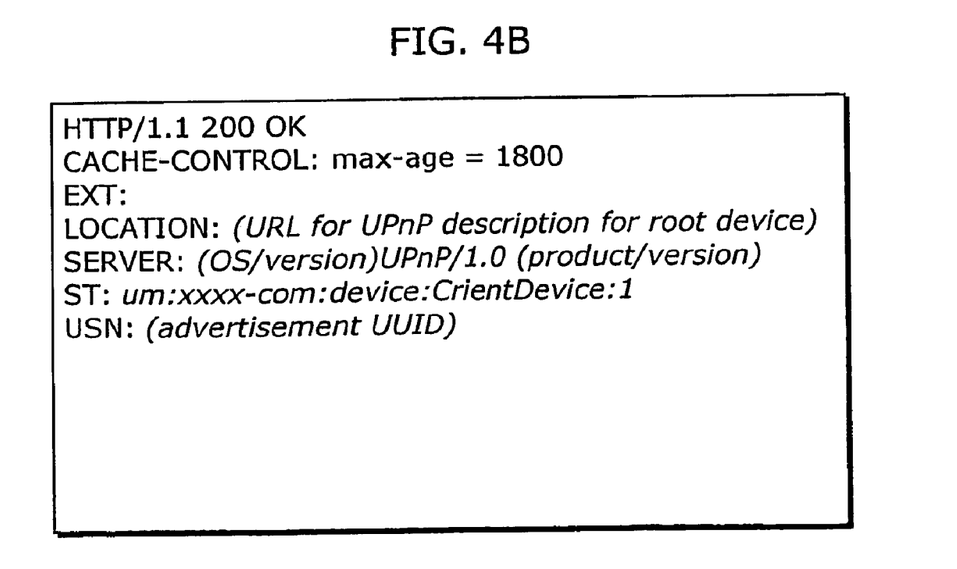
FIG. 4B is a diagram showing an example of the message indicating the correspondence with the search rules.

The device having "Client Device" as the device information, that is, the client device which is associated with the client registering, and to be registered in the server, when receiving the above mentioned "Client Device" search, responds regarding the fact that the client device corresponds with the search conditions (S11). "Client Device" is memorized as the device information in the ROM 205 of the client 2. A regular client device (control point) is not capable of responding with regard to a device search. However, the search information judgment unit 206 of the client 2 compares the information of the ROM 205 with the M-Search content received from the message communication unit 212. As a result of the comparison, if the search information judgment unit 206 confirms that the information corresponding with the M-Search content exists, the message communication unit 212 (i) generates a message indicating the above mentioned correspondence with the search conditions, as shown in FIG. 4B, and (ii) responds to the server 1 via the communication IF 207.

The response to the search request received by the server 1 includes a URL which can acquire Device Description. In order to acquire the Device Description of the UPnP, the device information acquisition unit 108 of the server 1 issues communication Inter-HTTP GET request, in the URL included in the response message, using the message communication unit 112, via the communication IF 107 (S12). The message communication unit 212 of the client 2 receives the HTTP GET request via the communication IF 207. The search information judgment unit 206 (i) compares the information of the ROM 205 with the content of the HTTP GET request received from the message communication unit 212, and (ii) outputs the Device Description information memorized by the ROM 205 to the message communication output unit 212. The message communication output unit 212 transmits the Device Description information acquired from the search information judgment unit 206, via the communication IF 207, to the server 1 (S13).

The Device Description information in addition to the information of the service set provided by the device type, includes: the device model name, the model number, the manufacturer name, the description information regarding the product, the serial number, the Friendly Name which is information for specifying a device, and the information regarding icon.

After receiving the response message from the client 2, so as to be able to judge a device desired to be registered for a user, using the device model name, Friendly Name and the like, from the Device Description information, the CPU 101 of the server 1 causes the GUI controller 110 to sequentially display a list of the devices corresponding with the search conditions on the monitor via the user operation IF 111.

Figure 2:
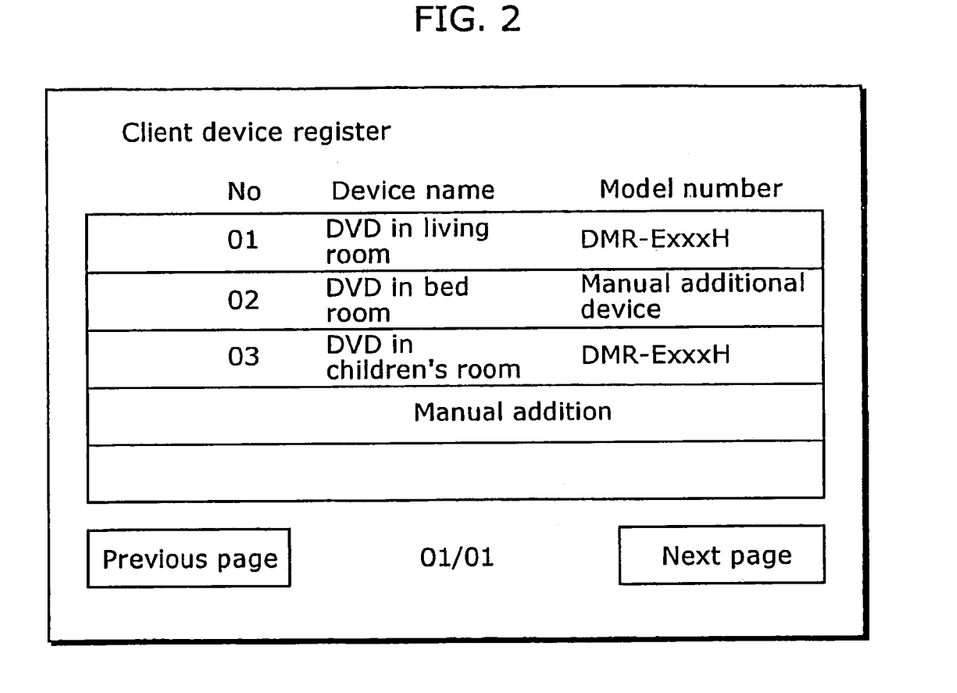
FIG. 2 is a diagram showing an example of the display screen according to the present invention.

FIG. 2 shows an example of the display screen. As shown in FIG. 2, the monitor displays the device name, the model number and the like. The Information regarding MAC address and IP address of each client acquired from the address acquisition unit 113 is added to each device information.

According to the input via the user operation IF 111, when the client 2 is specified, the information regarding the client 2 is transmitted to the CPU 101 via the GUI controller 110. The CPU 101 transmits the information regarding the client 2 to the device register unit 109. The device register unit 109 causes the memory unit 114 to memorize the Device Description information, MAC address and IP address of the client 2. At the same time, the GUI controller 110 generates and displays a list of the already registered devices by adding the information regarding the specified client 2.

Figure 3:
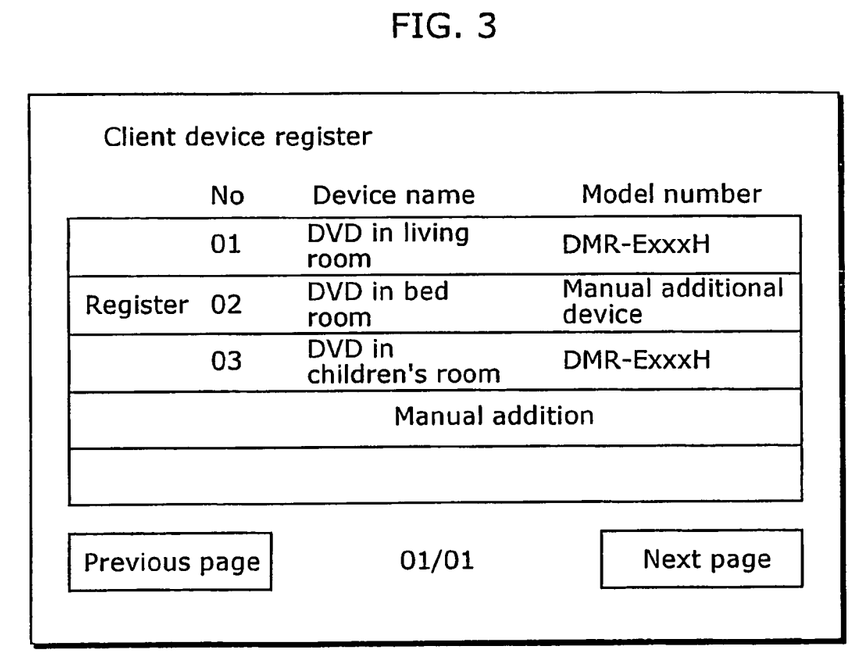
FIG. 3 is a diagram showing an example of the display screen for the client registering according to the present invention.

According to the present embodiment, as shown in FIG. 3, the above mentioned list of the already registered devices is displayed in the display screen, and the already registered devices are displayed as "registered". According to the present embodiment, registering number is set as four at the maximum. All of the Device Description information of the client needs not be memorized, and only the information for distinguishing the user so as to cancel the register of the registered client, for example, the Friendly Name may be memorized. Also, both of the MAC address and IP address need not be registered, and only the information used for the later mentioned procedures of access limit may be registered.

According to the input via the user operation IF 111, if the client 2 is reselected, the information regarding the reselected client 2 is transmitted to the CPU 101 via the GUI controller 110. The CPU 101 causes the device register unit 109 to cancel the register of the device memorized in the memory unit 114, and the display screen becomes as FIG. 2.

By using the configuration as described above, the server 1 can register a predetermined number of clients (according to the present embodiment, four at the maximum).

Here, by using the M-Search function of the UPnP in registering the client as well, compared to the case where a totally new protocol of client device registering function is added, it is possible to minimize the additional configuration by sharing SSDP and the like. In particular, in the case where the server and client functions are stored in one package, by sharing the search message generation part, the GUI display part of the search result and the like, the effect of the functions can be enhanced.

As described above, "Client Device" is searched for generating the list of the client devices within the LAN. However, the list of the client devices within the LAN may be generated by listing all of the UPnP-enabled devices within the LAN using the UPnP. Also, "Media Renderer" service indicating the reception and decoding reproduction functions may be searched.

According to the present embodiment, the register number is set as four, but the number is not limited as such.

(Second Embodiment)

According to the present embodiment, the case where access is limited using the information regarding the registered client in the network system according to the first embodiment will be explained.

The communication IF 107 of the server 1 accepts access from other devices using a plurality of IP ports. The UPnP is distributed in-home, and it is desirable that the UPnP device excludes access from outside home. Therefore, the server 1 executes the following processes.

The address acquisition unit 113 acquires the IP address of the accessing device based on the message received from the communication IF 107. The server 1 causes the CPU 101 to (I) calculate AND between (a) the self-address of the server 1 stored in the memory unit 114 acquired via the device register unit 109 and (b) the subnet mask set, (ii) further calculate AND between the IP address of the accessing device and the subnet mask set, and (iii) compare these two ANDs. As a result of the comparison, by causing the communication IF 107 to block the access from the non-corresponding device, the CPU 101 can exclude the access from the outside. A router device (not shown in the drawings) which connects the network 3 and the external network can also be used for excluding the access from the outside.

The server 1, in addition to the above mentioned exclusion of the access from outside home, excludes the access from other devices than the client devices registered in the memory unit 114, using the following procedures.

Figure 8B:
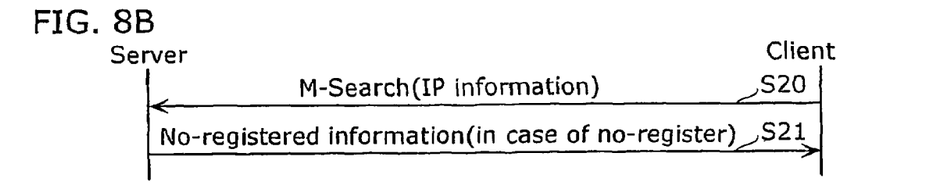
FIG. 8B is a communication sequence diagram between a server and client according to the second embodiment.

FIG. 8B is a communication sequence diagram between the server 1 and the client 2. After causing the GUI controller 210 and user operation IF 211 of the client 2 to display a menu screen of "function selection" as shown in FIG. 7, the message communication unit 212 transmits an M-Search message for searching a server to a device on the network 3 via the communication IF 207 (S20). The M-Search packet flows on the network 3, and includes IP address information.

After receiving the M-Search message from the communication IF 107, the server 1 acquires the IP address of the message sender from the address acquisition unit 113. The address acquisition unit 113 further (i) acquires the MAC address of the message sender associated with the acquired IP address, and (ii) outputs the MAC address to the CPU 101.

The CPU 101 compares (i) the MAC address of the device memorized in the memory unit 114 via the device register unit 109 with (ii) the MAC address of the message sender acquired using the address acquisition unit 113. If the MAC address of the message sender is not registered in the memory unit 114, the CPU 101 notifies the fact to the message communication unit 112 (S21). The message communication unit 112 does not output the transmitted message to the search information judgment unit 106, and aborts the message. Thus, the access from other devices than the registered devices cannot be accepted.

According to the present embodiment, the MAC address is used for the above mentioned comparison. However, the IP address may be memorized in the memory unit, and the comparison may be executed by using the IP address. From the viewpoint of security, access exclusion using the MAC address which does not change due to the network environment, and cannot be fabricated without expertise is considered to be more secure than using the IP address.

(Third Embodiment)

According to the method as explained in the second embodiment, the server 1 does not respond regarding the M-Search, and the number of the non-registered devices existing on the network cannot be confirmed. Also, in the case where the server 1 operates as the client device, when corresponding with the search from another server, the server 1 needs to respond with regard to the M-Search from the other server. However, there is a problem that the server 1 cannot respond with regard to the above mentioned M-Search from the other server.

According to the third embodiment, as another mounting method, the case where the server 1 responds with regard to the M-Search, but does not respond with regard to the following Device Description information acquisition and Service Description information acquisition will be explained.

Figure 8C:
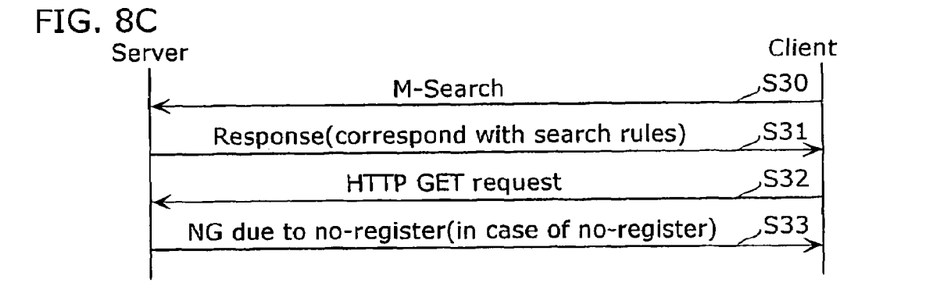
FIG. 8C is a communication sequence diagram between a server and client according to the third embodiment.

FIG. 8C is a communication sequence diagram between the server 1 and the client 2. As well as the conventional network system, the search information judgment unit 106 of the server 1 compares the information of the ROM 105 with the M-Search content received via the communication IF 107 and the message communication unit 112 (S30). As a result of the comparison, after confirming that the information corresponding with the M-Search content exists, the search information judgment unit 106 transmits the fact to the message communication unit 112. The message communication unit 112 generates a message indicating the correspondence with the search conditions, and responses the client 2 via the communication IF 107 (S31).

The device information acquisition unit 208 of the client 2 which acquired the above mentioned response via the communication IF 207 and message communication unit 212, so as to acquire the Device Description of the UPnP, causes the message communication unit 212 to issue HTTP GET request via the communication IF 207 (S32).

The server 1 acquires the MAC address of the sender of the received HTTP GET request, using the communication IF 107 and address acquisition unit 113.

The CPU 101 compares (i) the MAC address of the device memorized in the memory unit 114 via the device register unit 109 with (ii) the MAC address of the sender of the HTTP GET request acquired using the address acquisition unit 113. If the MAC address of the sender is not registered in the device register unit 109, the CPU 101 (i) generates an HTTP response indicating "No good (NG) due to the no-register" to the HTTP GET request transmitted by the message communication unit 112, and (ii) responses the client 2 via the communication IF 107 (S33).

Figure 5:
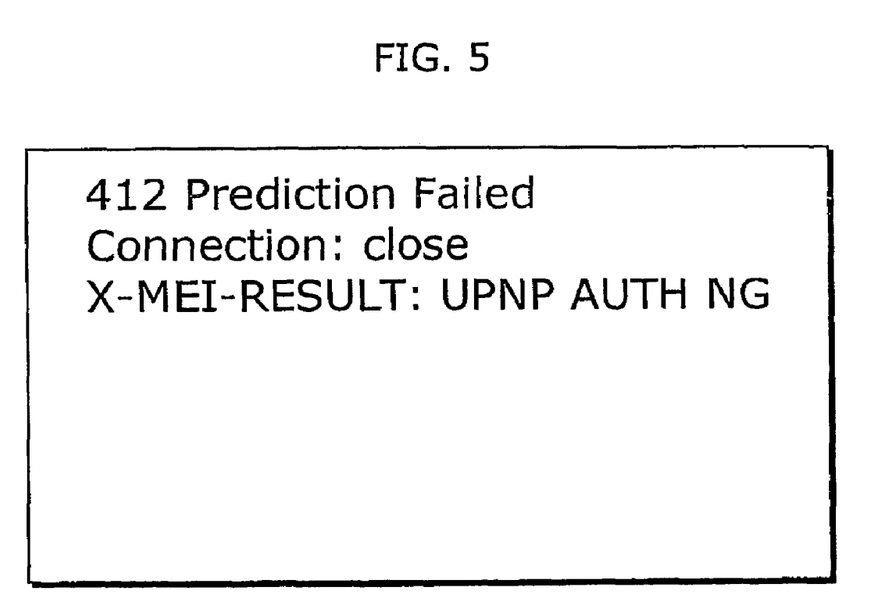
FIG. 5 is a diagram showing an example of the No Good (NG) message according to the present invention.

FIG. 5 shows an example of the response message. Due to the response message, the server 1 does not accept the request for the Device Description information from other devices than the registered devices.

After receiving the message indicating "NG due to the no-register" via the communication IF 207 and message communication unit 212, the CPU 201 of the client 2 analyzes the HTTP response, and understands that the request is rejected due to the no-register.

Thus, the request for the Service Description information acquisition from other devices than the registered devices cannot be accepted.

(Fourth Embodiment)

According to the method of the third embodiment, as the server 1 does not respond with regard to the Device Description information acquisition and Service Description information acquisition, the kind of non-registered devices that exists on the network cannot be confirmed. Also, in the case where the server 1 operates as a client device, and corresponds with the search from another server, when the ex-user of the server registers the client device, the device desired to be registered needs to be selected from the list of devices. However, there is a problem that enough information for selection (model number, device name and the like) cannot be acquired.

Thus, according to the present embodiment, as another mounting method, a countermeasure in which the server 1 responses the M-Search, Device Description information acquisition, and Service Description information acquisition, but does not response the content list acquisition request is conceivable, and will be explained as following.

Figure 8D:
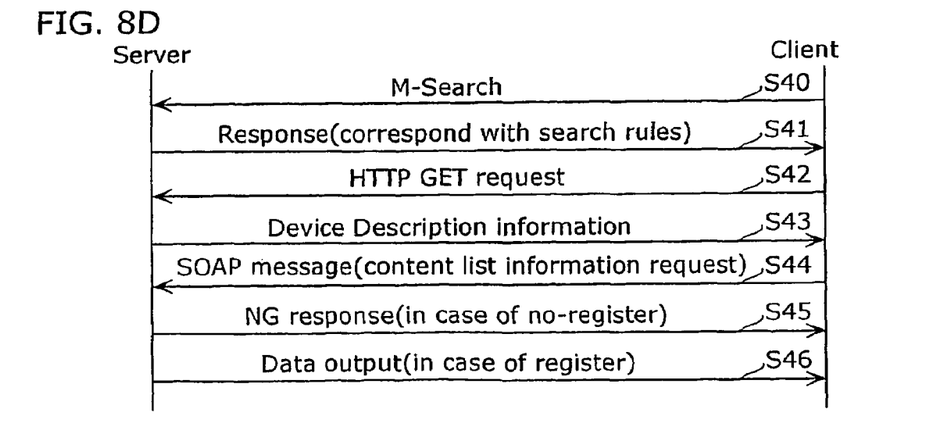
FIG. 8D is a communication sequence diagram between a server and client according to the fourth embodiment.

FIG. 8D is a communication sequence diagram between the server 1 and the client 2. The CPU 201 of the client 2 causes the GUI controller 210 and user operation IF 211 to display the menu screen of "function selection". Then, the message communication unit 212 transmits the M-Search message for searching the server for the device on the network 3 via the communication IF 207 (S40).

"Media Server" is memorized as device information in the ROM 105 of the server 1. The search information judgment unit 106 of the server 1 compares the information of the ROM 105 with the M-Search content received via the communication IF 107 and message communication unit 112. As a result of the comparison, after confirming that the information corresponding with the M-Search content exists, the search information judgment unit 106 (i) causes the message communication unit 112 to generate the message indicating the correspondence with the search conditions, and (ii) responds to the client 2 via the communication IF 107 (S41).

The device information acquisition unit 208 of the client 2 issues HTTP GET request, via the message communication unit 212 and the communication IF 207, in the URL included in the response message received via the communication IF 207 and message communication unit 212 (S42). The server 1 (i) acquires the Device Description information included in the ROM 105 from the search information judgment unit 106, and (ii) transmits the Device Description information from the message communication unit 112, via the communication IF 107, to the client 2 (S43).

After receiving the Device Description information via the communication IF 207 and message communication unit 212, the device information acquisition unit 208 of the client 2 outputs the information to the CPU 201. The CPU 201 analyzes the list of the XML format, and acquires information such as the device model name and Friendly Name. The CPU 201, using the acquired information, sequentially displays the list of the devices corresponding to the search conditions, via the GUI controller 210 and user operation IF.

The client 2, using the pointer (URL) to the Service Description included in the Device description information, acquires the Service Description in the HTTP GET for the URL.

The control point of the client 2, using the control, requests content list information of Contents Delivery Service (CDS) by SOAP message (S44). Here, after receiving the SOAP message requesting the content list, the server 1 acquires the MAC address of the sender using the communication IF 107 and address acquisition unit 113. The CPU 101 compares (i) the MAC address of the device memorized in the memory unit 114 via the device register unit 109 with (ii) the MAC address of the sender acquired using the address acquisition unit 113. If the MAC address of the sender is not registered, the CPU 101 (i) generates the NG response as shown in FIG. 5, using the message communication unit 112, and (ii) responses the client 2 via the communication IF 107 (S45).

Similarly, access to the control, that is, the control URL and access to the event registering, that is, the eventSubURL execute exclusion according to the MAC address registering. Also, stream acquisition, that is, access to the URL described in the Contents Directory Service executes exclusion according to the MAC address registering.

The CPU 201 of the client 2 directs the message communication unit 212 to access the URL of the server 1. Then, the message communication unit 212 (i) generates a message requesting data acquisition by HTTP GET, according to the above mentioned direction, and (ii) causes the communication IF 207 to transmit the message to the predetermined port of the communication IF 107 of the server 1. The server 1 compares (i) the MAC address of the device memorized in the memory unit 114 with (ii) the MAC address of the HTTP GET sender acquired using the address acquisition unit 113. If the MAC address of the sender is not registered, the server 1 (i) generates the NG response as shown in FIG. 5, using the message communication unit 112, and (ii) responses the client 2 via the communication IF 107. The server 1 (i) responses, as conventional, to the request from the device having the registered MAC address, and while adjusting the transmission timing and rate in the data output management unit 103, (ii) outputs the data included in the content data record reproduction unit 102 via the communication IF 107. The client 2, while adjusting the request using the data input management unit 203 so that the decoder 202 can process, (i) receives the data stream from the communication IF 207, and (ii) causes the decoder 202 to reproduce.

The client which cannot analyze the content of the NG response as shown in FIG. 5 cannot move on, simply by judging as having failed to acquire a server list, a content list and content data. On the other hand, the client 2 which can understand the content of the NG response, after receiving the NG response via the communication IF 207 and the message communication unit 212, interprets the content of the NG response using the CPU 201. The CPU 201 compares the NG response with the message memorized in the memory unit 214. In the case where the message corresponds with the character string of the NG response, the CPU 201 (i) causes the GUI controller 210 to generate a message such as "register the current device in the server", and (ii) displays the message on the monitor via the user operation IF 211. The user finds out the cause of failing to acquire the server list, content list and content by reading the message displayed on the monitor. And, the user can execute a countermeasure such as registering the client 2 into the server 1, according to the procedures as explained in the first embodiment. After executing the above mentioned registering, if the client 2 tries again to acquire the content list information from the server 1, the server 1 which has registered the client 2 correctly responds with regard to the acquisition request (S46). Thus, the client 2 can execute the content listing and content reproduction of the server 1.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The network system according to the present invention is useful as a network system in which (i) information is acquired by searching a client device from a server, (ii) a network AV client device can be registered using simple procedures by selecting and registering the client devices, and (iii) access limit can be realized. Also, from the registered client, without password input and the like, data can be acquired and reproduced. In addition, in the case where access is rejected due to the above mentioned access limit, the client device can distinguish the access limit from other reasons, and display the access limit to the user to recommend a client device registering.

The invention claimed is:

1. A server apparatus capable of transmitting stored content via a network, the server apparatus comprising:
   a transmission unit operable to transmit a first inquiry using a predetermined protocol to a network audio visual (AV) client apparatus connected via the network, the predetermined protocol including one of (a) a search message of a universal plug and play protocol, (b) a request message of a hypertext transfer protocol and (c) a content directory service of the universal plug and play protocol;
   a reception unit operable to receive a response to the first inquiry from the network AV client apparatus which transmitted the response;
   a first judgment unit operable to judge whether or not the response received by the reception unit is in a predetermined format;
   a memory unit operable to store, based on a judgment of the judgment unit, client information regarding the network AV client apparatus;
   a device register unit operable to register the client information regarding the network AV client apparatus which is selected by user operation;
   the reception unit also operable to receive a second inquiry using the predetermined protocol from the network AV client apparatus;
   a second judgment unit operable to judge whether or not a sender of a specific inquiry, which is the second inquiry or another inquiry received from the network AV client apparatus after the second inquiry is sent, is registered based on registered client information; and
   a response unit operable to output a response message that includes information that the sender is registered or not registered based on a judgment by the second judgment unit.

2. The server apparatus of claim 1, wherein the specific inquiry is the second inquiry.

3. The server apparatus of claim 1, wherein the specific inquiry is an HTTP GET inquiry.

4. The server apparatus of claim 1, wherein the specific inquiry is a content list information inquiry.

* * * * *